Patented Jan. 4, 1927.

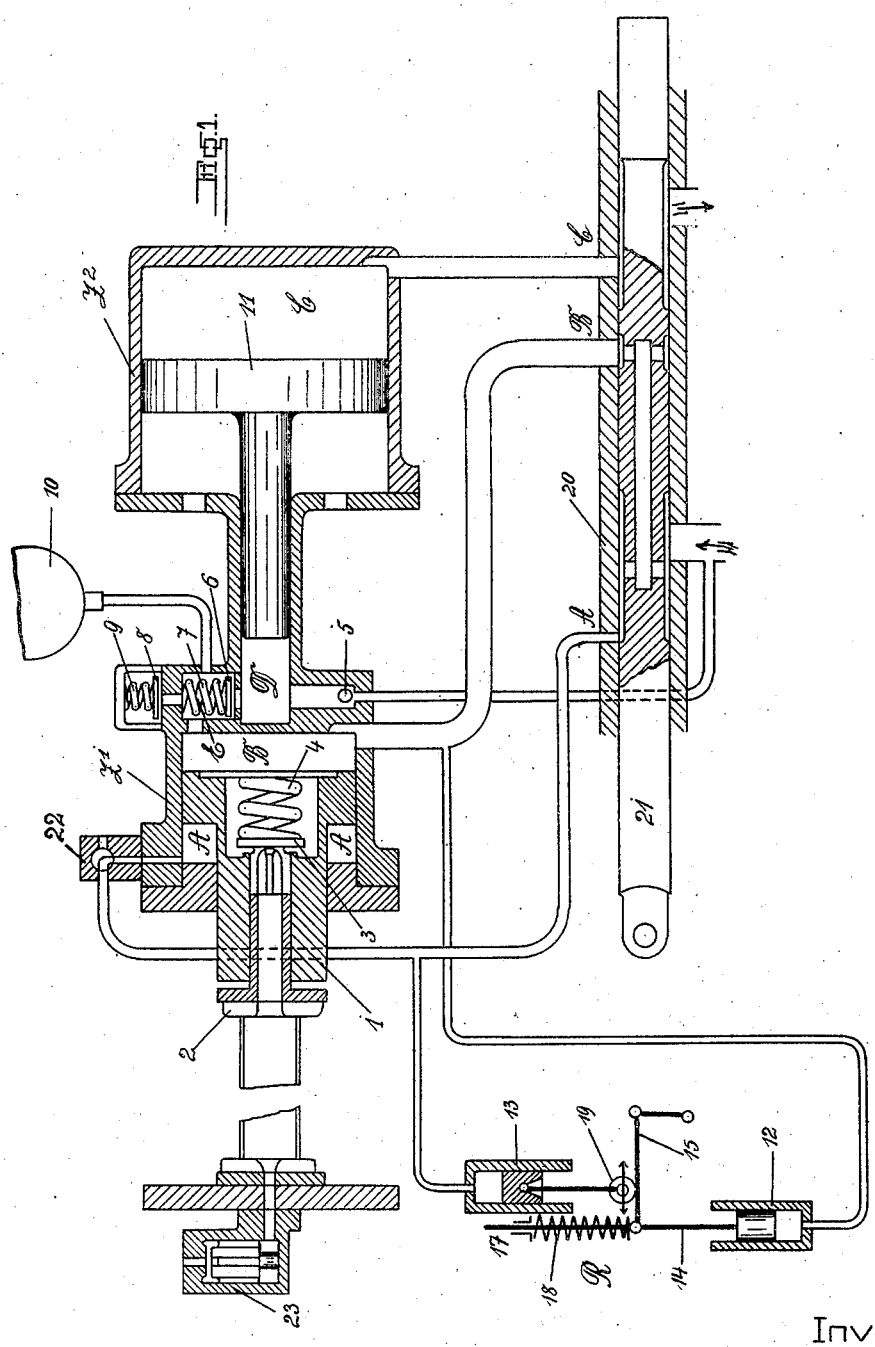

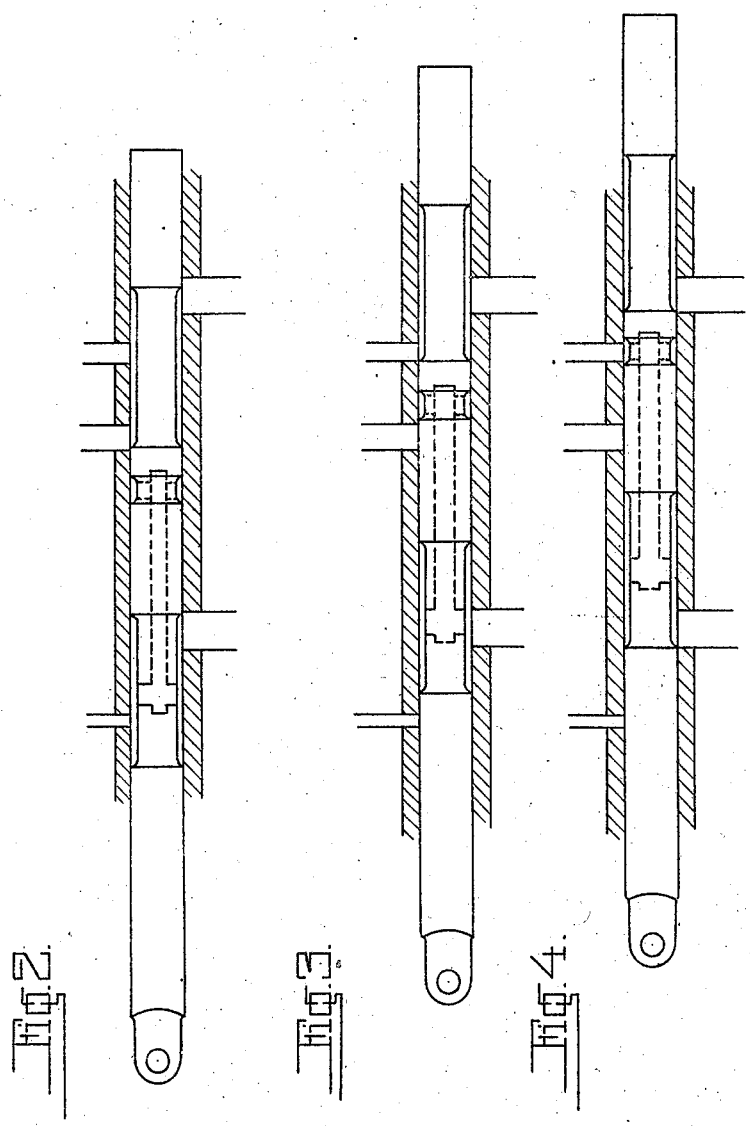

1,613,150

UNITED STATES PATENT OFFICE.

ANTON ZORE, OF ADAMSTHAL, NEAR BRUNN, CZECHOSLOVAKIA.

DEVICE FOR TESTING PIPES.

Application filed November 8, 1924, Serial No. 748,746, and in Germany November 5, 1923.

My invention relates to an improved device for testing pipes, especially boiler pipes, parts of armature, elements of hot water and steam-heating apparatus, and elements, to state their resistancy against inner pressure.

This invention consists principally in the application of two differential pistons, the spaces of which may be divided or connected in four different combinations by a sliding piston, with the aid of a conduit of water under pressure, whereby all managements which are required by such testing, say the putting the pipe under strain by the filling with water, the adjusting under testing pressure, and the discharge, are performed, one after another, in due succession by a mere shifting of the sliding piston.

A further purpose of this invention consists in adjusting the testing pressure of the tightening flanges by means of two special water-pistons, the pressure of which against each other may be controlled by a change of the leverage.

To make my invention completely understood, I refer to the accompanying drawings, which show, as an example, the application of my improved testing-device, in testing the air-pipes in railway-workshops. Fig. 1 shows, partially in a diagram, a longitudinal section through my improved testing-device, while Figs. 2, 3 and 4 indicate the varying positions of the sliding piston, to answer varying purposes.

On a bedding not shown, of suitable length, slightly inclined downwardly, the arrangement of the differential pistons has been shown at the deeper end, while on the bedding, at distances to be adjusted as desired, the flange of the abutment has been arranged in such a manner, that the return-action of the forces produced by the tightening of the pipe is taken up by the bedding.

The essential part of the device consists of the two cylinders $z^1$ and $z^2$ within which, by means of the differential pistons 1 and 11, four spaces A, B, C, D, have been formed. These four spaces are supplied, by choice, by means of the sliding-piston 21 moving within the casing 20, with water from the conduit under pressure of about 2 atmospheres, according to actual position of said piston, or they are connected to each other, or to the discharge-pipe.

The differential piston 1 carries within its hollow piston-rod, projecting from the cylinder, the binding flange 2, which, by itself, forms a kind of dipping-piston, carrying in its face a flanged disc of leather or the like.

When the steering-piston has been shifted into the position shown by Fig. 2, the spaces A and D will stand under the pressure of the driving water, while the spaces B and C are without pressure. The two pistons 1 and 11 are going into their outermost right-hand position. Now, the pipe to be tested is placed between the tightening flange 2 and the resistance-flange, which, previously, has been adjusted at about the distance required by the distance of the length of the pipe up to the next resistance-flange.

The valve 6 shutting the space D against the space B is so much loaded by the spring 7, that it cannot yield to the pressure of the water from the conduit.

In Fig. 1 it is shown, that the steering-piston 21 has been brought by hand into the position of Fig. 1. The spaces A, B, and D, now, stand under the pressure of water, while the space C is without pressure. The piston 11, accordingly, will remain within its outermost position to the right, while the piston 1, owing to the difference of the area at both sides of the piston, will be shifted to the left. The flange 2, by means of this motion, will place the pipe to be tested into a fixed position between itself and the abutment-flange. On the further movement of the piston 1, while the piston 2 is prohibited from further following the piston, the said piston 2, on bearing with its dipping-piston-end against the valve 3, will open the latter against the pressure of the spring 4, thus allowing the water to issue from the space B through a bore of the flange and to enter into the pipe to be tested, filling the same.
To permit the air to escape from said pipe, a pipe has been established near the abutment-flange, which bore connects with the casing of the valve 23. This valve is so calculated, that it continues in a lowered state, as long as the air continues to escape, while it is lifted by the water which follows, thus prohibiting the escape of water. The pipe to be tested is now filled by the water coming from the feeding conduit. To expose the pipe to the required trial test the controlling-piston 21 should be brought into the position IV, Fig. 4. The spaces A and B then, are cut off and spaces D and C are connected to the water-supply. The piston 1 remains bearing against the testing-pipe, the piston 11 is moving to the left, under the influence of the greater acting area. The smaller piston-area, advancing within the space D, causes the shutting of the return-valve 5. By means of an increased pressure, the spring-pressure 7 loading the valve 6, will be overcome, and the pressure will be transmitted into the space B and through the valve 3, kept as described, into the pipe to be tested. The pressure of water reached may be read from the manometer 10. As soon as the desired testing pressure has been reached, the controlling-piston 21 is shifted into the position LII. The spaces A and B, now, are closed, space D is placed under the pressure of water, and space C is connected to the discharge-pipe and, therefore, without any pressure. The pipe to be tested, accordingly is retained under the higher pressure, its joints are hammered and the pipe is examined, so as to reveal possible weaknesses and the pipe may be tested by knocking off for ascertaining its durability of the seam and the like, while the piston 11 returns to the utmost position to the right, as in the beginning.

Hereafter, the controlling-piston is returned into its primary position I (Fig. 1), spaces A and D are put under the pressure of water, and spaces B and C are connected to the discharge-pipe. The piston 1 recedes towards the right, whereby the tested pipe becomes free and another pipe may be put to testing, the proceeding going on as described before.

To prevent any danger by careless manœuvring, a security valve has been arranged consisting of a spring 8 which opens as soon as the maximum pressure for which the apparatus has been constructed, has been reached.

To prevent thin pipes from bending and from cutting into the pads under the pressure of the buffer during the testing process, means may be provided, as shown in Fig. 1, for regulating this pressure. For this purpose two cylinders 12 and 13 are provided which are fitted with pistons and connected, one with the chamber B and the other with the chamber A. The piston of the cylinder 12 is controlled by a spring 18 which surrounds the piston rod 14 and bears against an abutment on the rod as well as against a fixed abutment 17. A lever 15 has its free end connected to the rod 14 and supports the piston of the cylinder 13 by means of a roller 19. The piston of the cylinder 12 will thus, under the pressure in the chamber B, act on the piston of the cylinder 13 by means of the lever 15, and the leverage can be varied by an adjustment of the roller 19 so that a reaction is set up in the chamber A which prevents excessive buffer pressure.

In order to be able to obtain a very large amount of pressure, for instance in testing armatures with a very wide packing-flange but equally to be obtained with the flange 2 indicated, I have provided a three-way-cock 22, which permits to connect the said space A with the outside atmosphere, thereby avoiding counter-pressure within said space.

I claim as my invention:

1. A hydraulic pipe-testing device comprising two differential pistons, a clamping device operated by one piston for holding the pipe during the test, and means for setting the pipe in communication first with the water supply and then with the pressure chamber of the other piston for raising the pressure, substantially as set forth.

2. In a pipe testing device according to claim 1, the provision of a hand-operated piston valve and means whereby four different settings of the valve bring about the application of the clamps to the pipe and the filling of the latter with water, the raising of the water pressure in the pipe, the closing of the ducts to maintain the testing pressure, and the return of the pistons to the starting position, substantially as set forth.

3. A device according to claims 1 and 2 in which the clamping piston is hollow and fitted with a hollow, slidable and spring-pressed buffer for application to the pipes, substantially as set forth.

4. A device according to claim 3 the buffer so formed that the displacement of the buffer relative to the piston on engagement with the pipe, causes a valve to be opened for admitting water through the piston to the pipe, substantially as set forth.

5. A device according to claims 1 to 4 in which the small working space of the high-pressure piston communicates with the pipe through the clamping piston and through a duct fitted with a valve which is closed by a spring against the normal pressure and which opens the communication as the pressure increases, substantially as set forth.

6. A device according to claims 1 to 5 in which the working spaces at both sides of the clamping piston communicate with cylinders fitted with pistons which react on each other through the medium of levers and with variable leverage so as to moderate the pressure with which the clamp is applied to the pipe, substantially as set forth.

7. A device according to claims 1 to 6 in which means are provided for setting the small working space of the clamping piston into communication with the atmosphere, substantially as and for the purpose set forth.

8. A device according to claims 1 to 7 in which the clamping device comprises an adjustable hollow counter-support adapted to take one end of the pipe to be tested, the support being in communication with a valve chamber containing a buoyant valve which allows the air to driven out by the water when the pipe is filled and which closes when the water enters the valve chamber so as to resist the water pressure, substantially as set forth.

In testimony whereof I have affixed my signature.

ANTON ZORE.